(12) United States Patent
Noh et al.

(10) Patent No.: US 10,231,234 B2
(45) Date of Patent: Mar. 12, 2019

(54) METHOD FOR MEASURING INTER-DEVICE INTERFERENCE IN FULL-DUPLEX WIRELESS COMMUNICATION SYSTEM AND APPARATUS THEREFOR

(71) Applicant: LG Electronics Inc., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 15/317,698

(22) PCT Filed: Mar. 31, 2015

(86) PCT No.: PCT/KR2015/003170
§ 371 (c)(1),
(2) Date: Dec. 9, 2016

(87) PCT Pub. No.: WO2015/190677
PCT Pub. Date: Dec. 17, 2015

(65) Prior Publication Data
US 2017/0111906 A1    Apr. 20, 2017

Related U.S. Application Data

(60) Provisional application No. 62/011,075, filed on Jun. 12, 2014.

(51) Int. Cl.
*H04L 5/14* (2006.01)
*H04L 5/00* (2006.01)
*H04W 28/02* (2009.01)
(Continued)

(52) U.S. Cl.
CPC ...... *H04W 72/0446* (2013.01); *H04B 17/345* (2015.01); *H04L 5/0082* (2013.01);
(Continued)

(58) Field of Classification Search
CPC ............. H04W 72/0446; H04W 24/08; H04W 28/0236; H04W 72/0413; H04W 72/042;
(Continued)

(56) References Cited

U.S. PATENT DOCUMENTS 9,462,498 B2 * 10/2016 Lee ........................ H04W 24/10
9,742,546 B2 *  8/2017 Seo ........................ H04W 24/02
(Continued)

FOREIGN PATENT DOCUMENTS

| KR | 10-2014-0008257 A | 1/2014 |
|---|---|---|
| KR | 10-2014-0058644 A | 5/2014 |
| WO | 2012/129853 A1 | 10/2012 |

OTHER PUBLICATIONS

LG Electronics: "Resource Allocation and Interference Coordination in D2D Communications", R1-134412, 3GPP TSG RAN WG1 Meeting #74bis, Guangzhou, China, Oct. 7-11, 2013.

*Primary Examiner* — Ivan O Latorre
(74) *Attorney, Agent, or Firm* — Dentons US LLP

(57) ABSTRACT

A method for measuring inter-device interference (IDI) by a terminal in a wireless communication system supporting full-duplex communication according to an embodiment of the present invention comprises the steps of: determining the total number of times of IDI measurement required for a terminal group to which the terminal belongs; determining a basic sub-frame configuration pattern on the basis of the determined total number of times of the IDI measurement; and measuring the IDI as many times as the number of times allocated to the terminal by applying a terminal-specific shift value to the basic sub-frame configuration pattern.

6 Claims, 14 Drawing Sheets

(51) Int. Cl.
*H04W 72/04* (2009.01)
*H04B 17/345* (2015.01)
*H04W 24/08* (2009.01)
*H04W 52/14* (2009.01)

(52) U.S. Cl.
CPC ............... *H04L 5/14* (2013.01); *H04W 24/08* (2013.01); *H04W 28/0236* (2013.01); *H04W 52/146* (2013.01); *H04W 72/042* (2013.01); *H04W 72/0413* (2013.01); *H04L 5/0023* (2013.01); *H04L 5/0062* (2013.01)

(58) Field of Classification Search
CPC ...... H04W 52/146; H04L 5/14; H04L 5/0082; H04L 5/0062; H04L 5/0023; H04B 17/345
See application file for complete search history.

(56) References Cited

U.S. PATENT DOCUMENTS

| | | | |
|---|---|---|---|
| 9,876,625 B2* | 1/2018 | Seo | H04L 5/0073 |
| 9,883,507 B2* | 1/2018 | Thubert | H04W 28/04 |
| 9,913,285 B2* | 3/2018 | Li | H04W 72/1263 |
| 2013/0272196 A1* | 10/2013 | Li | H04W 72/044 370/328 |
| 2014/0016619 A1* | 1/2014 | Kim | H04W 72/082 370/336 |
| 2015/0245375 A1* | 8/2015 | Li | H04L 5/0051 370/329 |
| 2015/0327261 A1* | 11/2015 | Thubert | H04W 40/22 370/336 |
| 2017/0245167 A1* | 8/2017 | Noh | H04W 24/10 |

* cited by examiner

FIG. 2
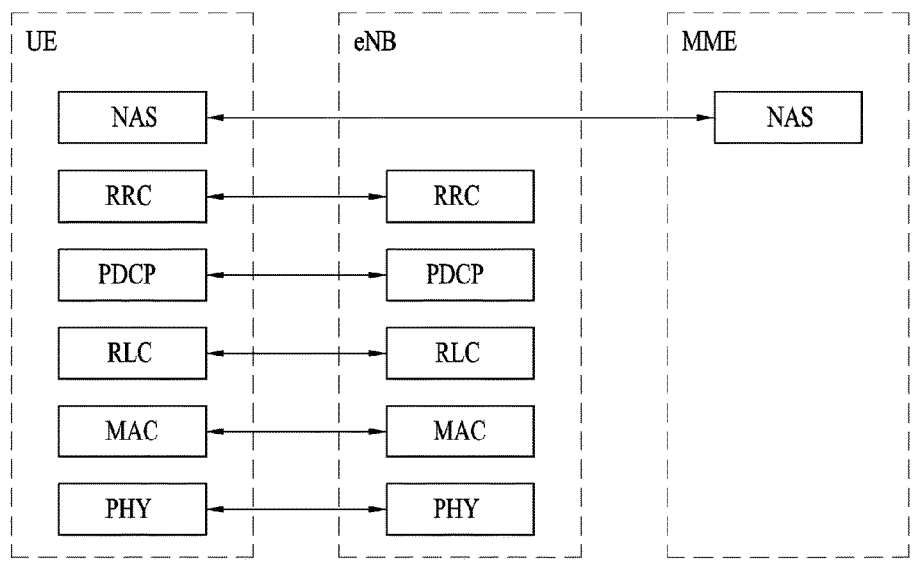
(a) Control-plane protocol stack
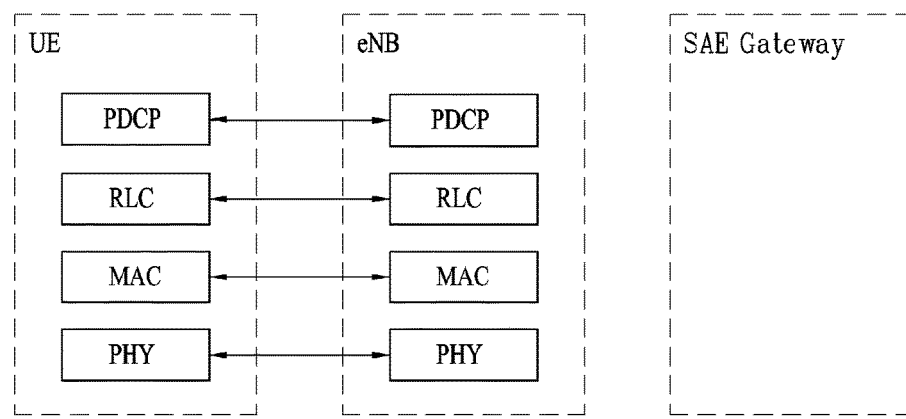
(b) User-plane protocol stack

| Measurement UE \ Target UE | a | b | c | d | e |
|---|---|---|---|---|---|
| a | X | O | O | O | O |
| b | O | X | O | O | O |
| c | O | O | X | O | O |
| d | O | O | O | X | O |
| e | O | O | O | O | X |

(b)

| Measurement UE \ Target UE | a | b | c | d | e |
|---|---|---|---|---|---|
| a | X | O | O | O | O |
| b | X | X | O | O | O |
| c | X | X | X | O | O |
| d | X | X | X | X | O |
| e | X | X | X | X | X |

FIG. 12

| Measurement UE \ Target UE | a | b | c | d | e |
|---|---|---|---|---|---|
| a | U | D | D | X | X |
| b | X | U | D | D | X |
| c | X | X | U | D | D |
| d | D | X | X | U | D |
| e | D | D | X | X | U | time →

FIG. 13

| Measurement UE \ Target UE | a | b | c | d |
|---|---|---|---|---|
| a | U | D | D | X |
| b | X | U | D | D |
| c | X | X | U | D |
| d | D | X | X | U | time →

FIG. 14

|  |  | subframe | | | | |
|---|---|---|---|---|---|---|
|  |  | #0 | #1 | #2 | #3 | #4 |
| Measurement UE | a | UL | DL | DL | DL | DL |
|  | b | DL | UL | DL | DL | DL |
|  | c | DL | DL | UL | DL | DL |
|  | d | DL | DL | DL | UL | DL |
|  | e | DL | DL | DL | DL | UL |

METHOD FOR MEASURING INTER-DEVICE INTERFERENCE IN FULL-DUPLEX WIRELESS COMMUNICATION SYSTEM AND APPARATUS THEREFOR

This application is a 35 USC § 371 National Stage entry of International Application No. PCT/KR2015/003170 filed on Mar. 31, 2015, and claims priority to U.S. Provisional Application No. 62/011,075 filed on Jun. 12, 2014, all of which are hereby incorporated by reference in their entireties as if fully set forth herein.

TECHNICAL FIELD

The present invention relates to a wireless communication system, and more particularly to a method and apparatus for measuring Inter-Device Interference (IDI) in a full-duplex wireless communication system.

BACKGROUND ART

3GPP LTE (3rd generation partnership project long term evolution) and LTE-A (LTE-advanced) will now be described as an exemplary mobile communication system to which the present invention is applicable.

FIG. 1 illustrates E-UMTS (evolved universal mobile telecommunication system) as an exemplary mobile communication system. E-UMTS evolved from UMTS (universal mobile telecommunication system) is currently standardized in 3GPP. E-UMTS may be regarded as an LTE system. For technical specifications of UMTS and E-UMTS, reference can be made to Release 8 and Release 9 of "3rd Generation Partnership Project; Technical Specification Group Radio Access Network".

Referring to FIG. 1, E-UMTS includes a user equipment (UE), a base station (BS) and an access gateway (AG) located at the end of a network (E-UTRAN) and connected to an external network. The BS can simultaneously transmit multiple data streams for multicast service, and/or unicast service.

One or more cells are present in a BS. A cell is set to one of bandwidths of 1.25, 2.5, 5, 10, 15 and 20 MHz and provides downlink or uplink service to a plurality of UEs. Different cells may provide different bandwidths. The BS controls data transmission/reception to/from a plurality of UEs. The BS transmits downlink scheduling information about downlink data to the UE to inform the UE of a time/frequency region in which data will be transmitted, coding, data size, hybrid automatic repeat and request (HARQ) related information, etc. In addition, the BS transmits uplink scheduling information about uplink data to the UE to inform the UE of a time frequency region that can be used by the UE, coding, data size, HARQ related information, etc. An interface for user traffic or control traffic transmission may be used between BSs. A core network (CN) may be composed of a network node for user registration of the AG and UE. The AG manages mobility of the UE for each tracking area (TA) composed of a plurality of cells.

While wireless communication technology has been developed to LTE on the basis of wideband code division multiple access (WCDMA), demands and expectations of users and service providers continuously increase. Furthermore, new wireless access technologies are continuously developed, and thus technical evolution is needed to achieve competitiveness. That is, reduction in cost per bit, service availability increase, flexible use of frequency bands, simple structure and open interface, appropriate power consumption of a UE, etc. are required.

UE transmits periodic and/or aperiodic reports regarding current channel status information to a base station such that the base station operates efficiently. Since the channel status information includes results computed based on varies situations, a more efficient reporting method is required.

DISCLOSURE

Technical Problem

An object of the present invention is to provide a method and apparatus for efficiently measuring IDI in a full-duplex wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The object of the present invention can be achieved by providing a method for allowing a user equipment (UE) to measure inter-device interference (IDI) in a wireless communication system supporting full duplex communication including: determining a total number of IDI measurement times needed for a UE group including the UE; determining a basic subframe configuration pattern on the basis of the determined total number of IDI measurement times; and performing IDI measurement for a number of times allocated to the UE by applying a UE-specific shift value to the basic subframe configuration pattern.

In accordance with another aspect of the present invention, a user equipment (UE) for supporting full duplex communication includes: a radio frequency (RF) module configured to transmit and receive a RF signal to and from a base station (BS); and a processor configured to control the RF module, wherein the processor determines a total number of IDI measurement times needed for a UE group including the UE, determines a basic subframe configuration pattern on the basis of the determined total number of IDI measurement times, and perform IDI measurement for a number of times allocated to the UE by applying a UE-specific shift value to the basic subframe configuration pattern.

The total number of IDI measurement times may be determined in consideration of channel reciprocity in the full duplex communication.

When the UE group includes a total of N UEs, the total number of IDI measurement times corresponds to $_NC_2$.

The UE may receive an identifier list in which identifiers (IDs) of UEs contained in the UE group are arranged according to a predetermined order.

The basic subframe configuration pattern may include: a first-type subframe in which the UE is used as a target object of the IDI measurement; a second-type subframe in which the UE performs the IDI measurement; and a third-type subframe in which the UE is not used as the target object of the IDI measurement and does not perform the IDI measurement. In the third-type subframe, uplink (UL) transmission of the UE may be prohibited.

The determining the basic subframe configuration pattern may include: configuring at least one uplink (UL) subframe and floor($_NC_2/N$) downlink (DL) subframes into the basic subframe configuration pattern; and determining whether to add a DL subframe to the basic subframe configuration pattern according to a value of $_NC_2$-floor($_NC_2$/N)*N, wherein N is the number of UEs contained in the UE group, and floor ($_NC_2$/N) is a maximum integer not exceeding the value of $_NC_2$/N.

The UE-specific shift value may be determined on the basis of a predetermined arrangement order of UEs contained in the UE group.

Advantageous Effects

As is apparent from the above description, the embodiments of the present invention can allow a user equipment (UE) to efficiently measure IDI using channel reciprocity in a full-duplex wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention. In the drawings:

FIG. 2 shows a control plane and a user plane of a radio interface protocol between a UE and an E-UTRAN based on a 3GPP radio access network standard.

FIG. 11 is conceptual diagram illustrating a method for measuring IDI according to an embodiment of the present invention.

FIG. 12 is a conceptual diagram illustrating a method for measuring IDI according to another embodiment of the present invention.

FIG. 13 is a conceptual diagram illustrating a method for measuring IDI according to still another embodiment of the present invention.

FIG. 14 is a conceptual diagram illustrating a method for measuring IDI according to still another embodiment of the present invention.

MODE FOR INVENTION

Figure 1:
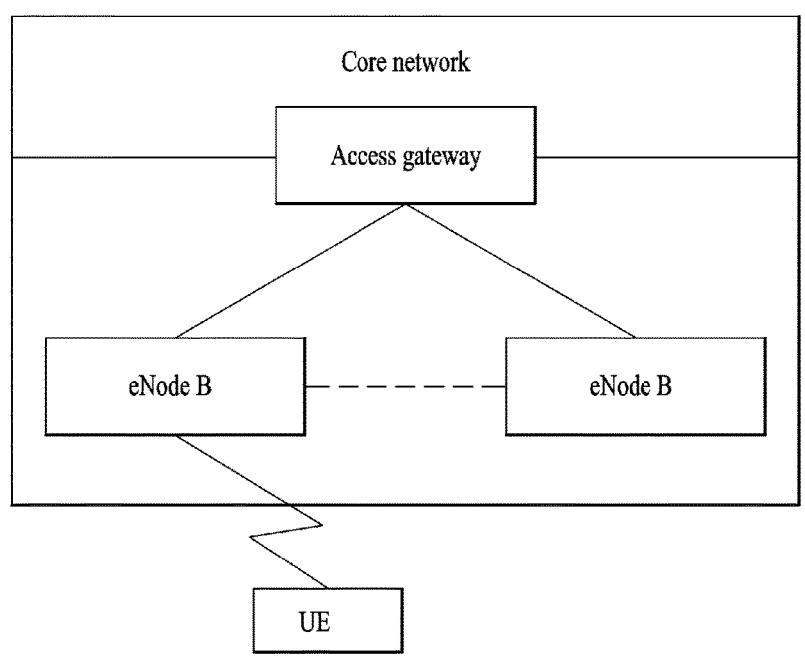
FIG. 1 illustrates E-UMTS network structure as an exemplary mobile communication system.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on IEEE 802.11 systems. However, technical features of the present invention are not limited thereto. It should be noted that specific terms disclosed in the present invention are proposed for convenience of description and better understanding of the present invention, and the use of these specific terms may be changed to other formats within the technical scope or spirit of the present invention.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages, which are used for managing a call between the UE and the network. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer on an upper layer via a transport channel Data is transported between the MAC layer and the PHY layer via the transport channel. Data is also transported between a physical layer of a transmitting side and a physical layer of a receiving side via a physical channel. The physical channel uses a time and a frequency as radio resources. In detail, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively narrow bandwidth.

A Radio Resource Control (RRC) layer located at the bottom of a third layer is defined only in the control plane and is responsible for control of logical, transport, and physical channels in association with configuration, reconfiguration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
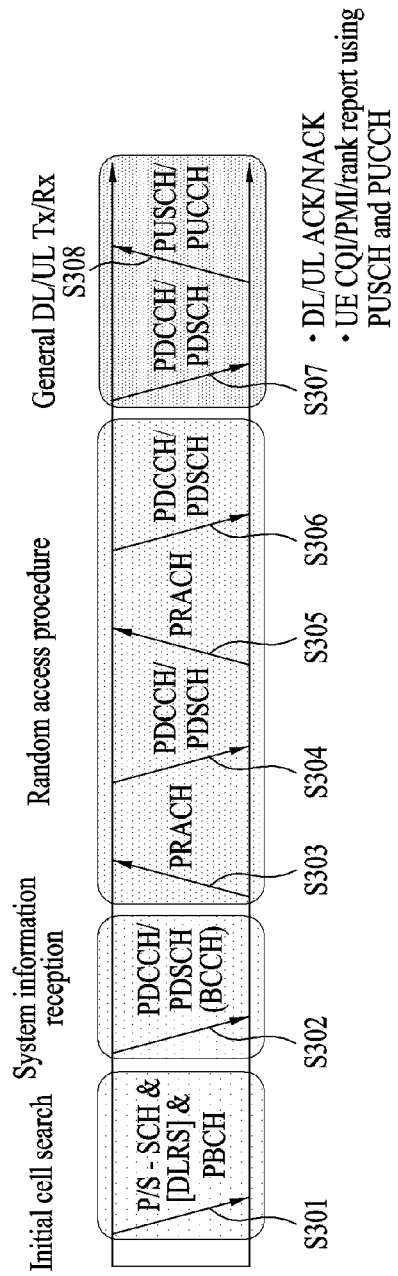
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
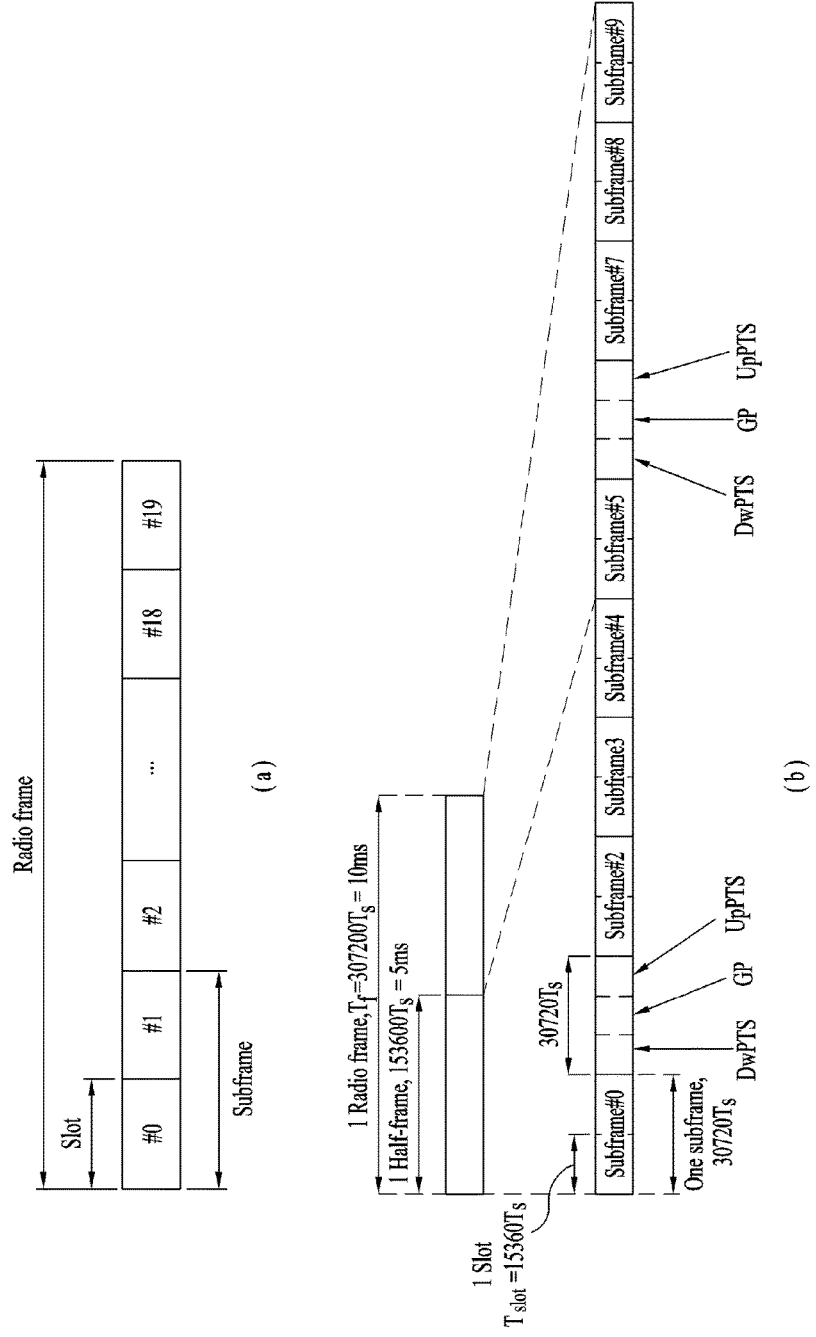
FIG. 4 is a diagram showing the architecture of a radio frame used in LTE system.

FIG. 4 is a diagram showing the architecture of a radio frame used in Long Term Evolution (LTE).

Referring to FIG. 4, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 4 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP.

In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
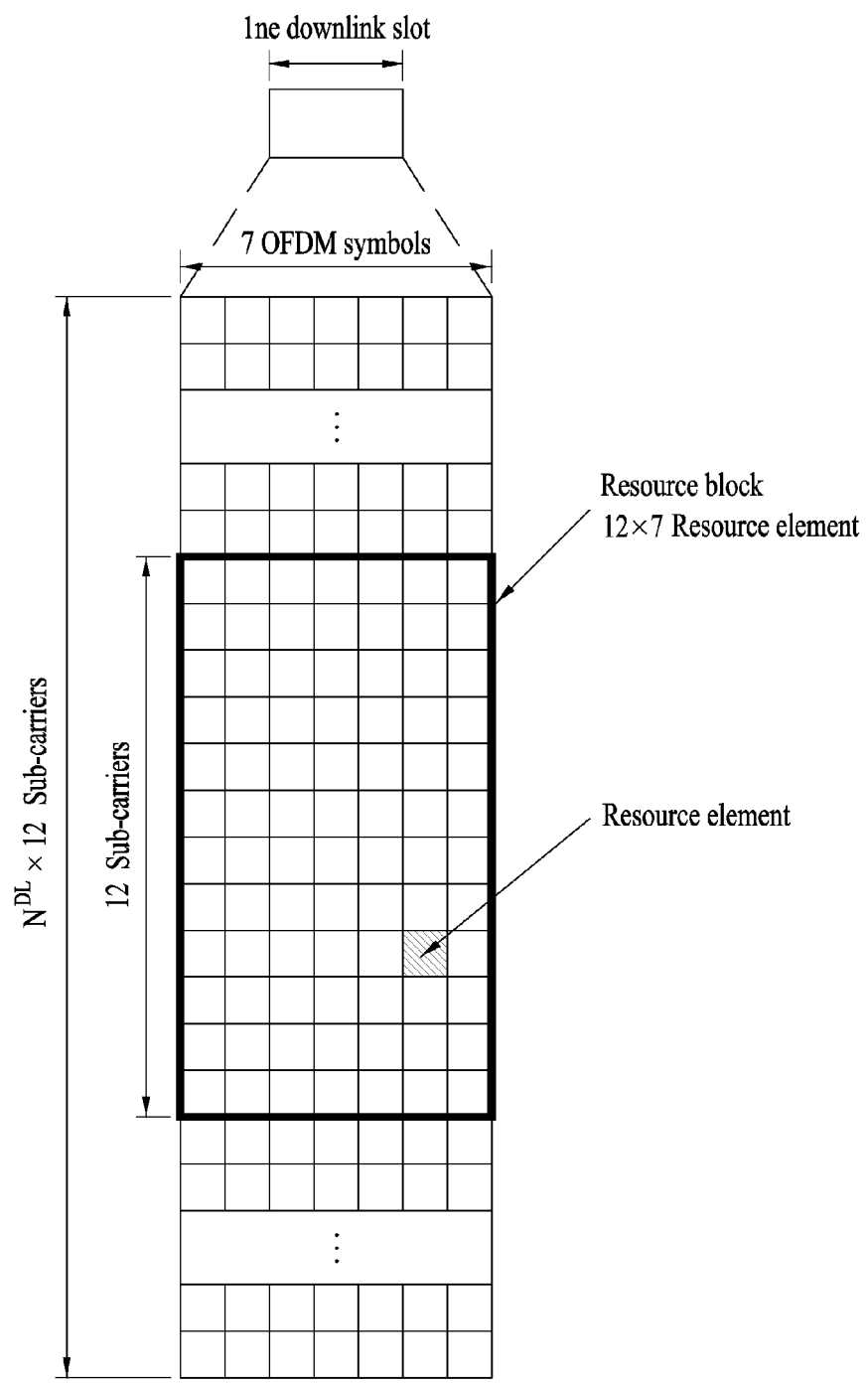
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
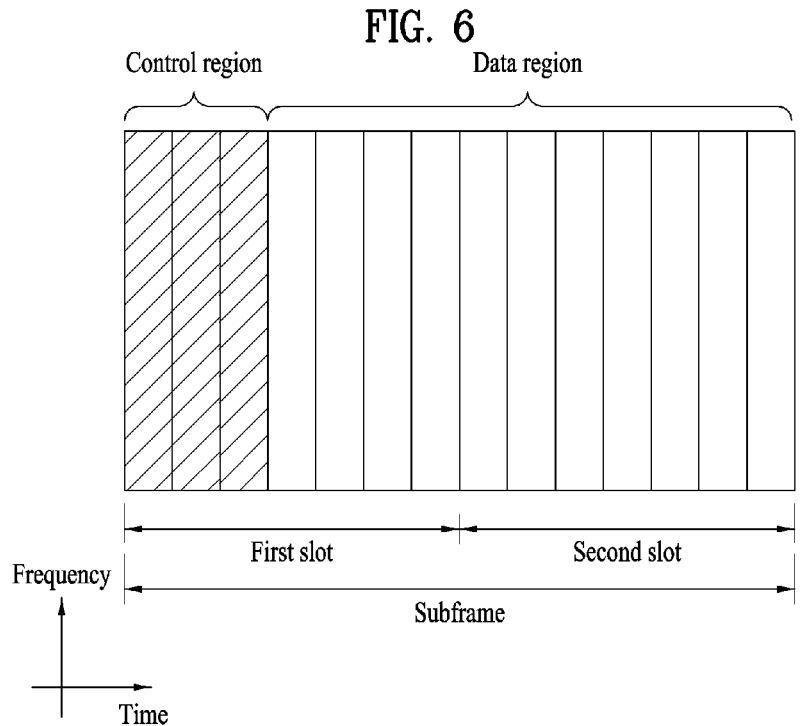
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
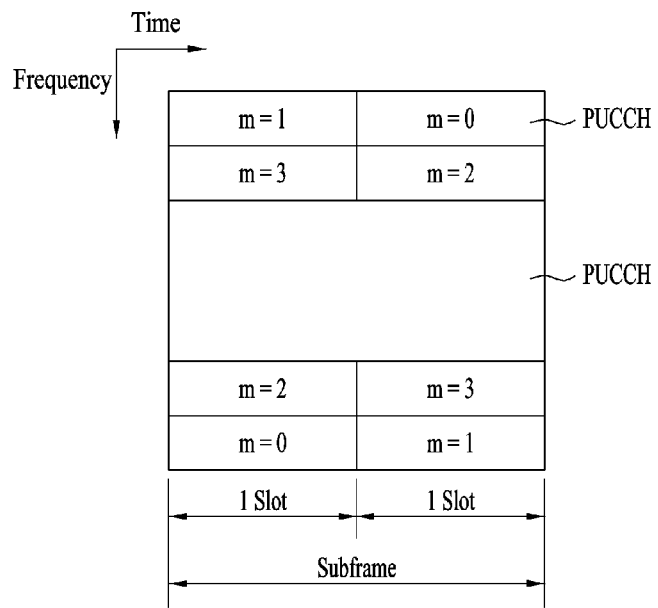
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH.

This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

A method for performing IDI measurement-based scheduling in a full duplex communication system within the same resources on the basis of the above-mentioned content will hereinafter be given.

Figure 8:
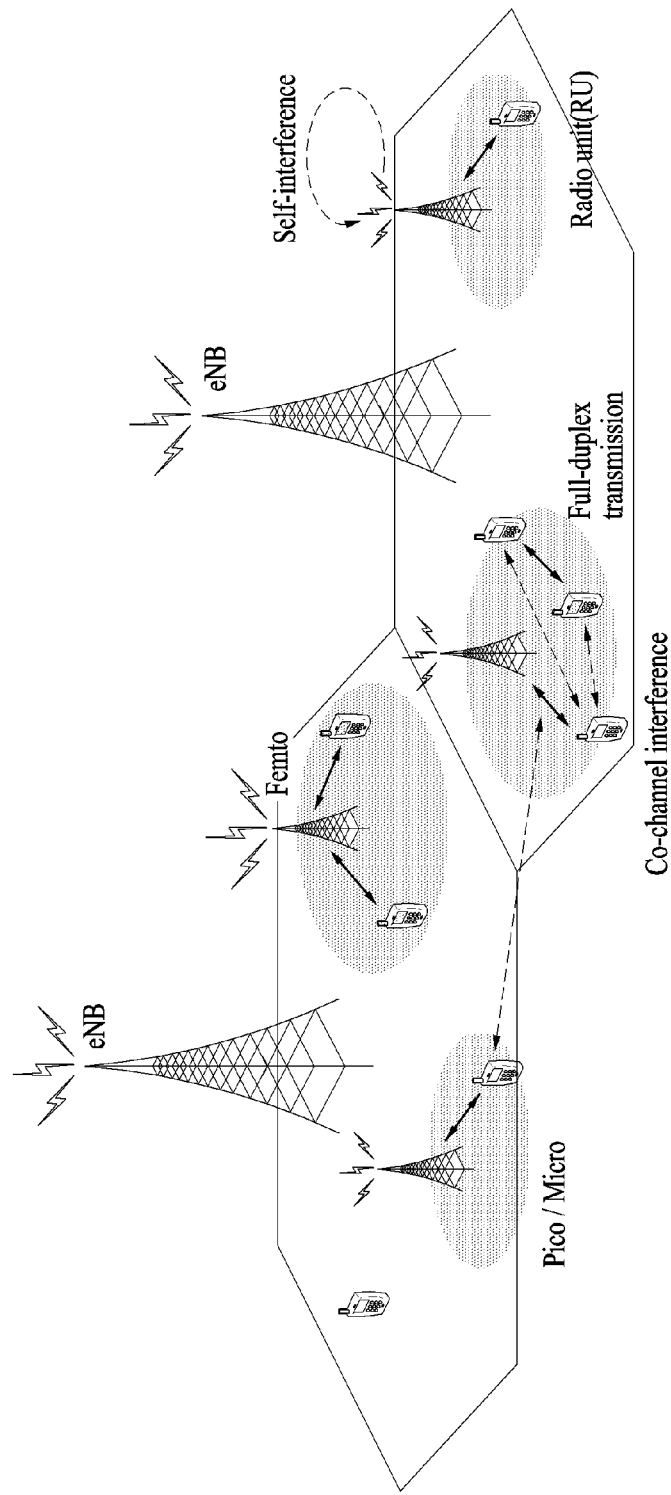
FIG. 8 is a conceptual diagram illustrating a full duplex radio (FDR) communication system.

FIG. 8 is a conceptual diagram illustrating a full duplex radio (FDR) communication system. Referring to FIG. 8, the FDR may refer to a system for simultaneously performing transmission/reception (Tx/Rx) using the same resources by a transmission device (e.g., a UE and a BS). In this case, the same resources may refer to radio resources having the same time and the same frequency. As shown in FIG. 8, a UE and a BS for supporting FDR may be present. In this case, interference may be largely classified into intra-device interference and inter-device interference according to FDR support. The intra-device interference may refer to the case in which an output signal of a transmission (Tx) antenna is received by a reception (Tx) antenna within one BS or one UE such that interference occurs. The inter-device interference may refer to the case in which an uplink (UL) signal transmitted from BS, UE, or the like is received by the BS or UE such that interference occurs.

The following description will be given centering on inter-device interference (hereinafter referred to as IDI) for convenience of description.

Figure 9:
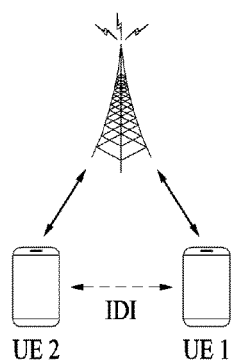
FIG. 9 is a conceptual diagram illustrating inter-device interference (IDI).

FIG. 9 is a conceptual diagram illustrating inter-device interference (IDI). Referring to FIG. 9, IDI may refer to interference generated in FDR because the same radio resources are used in one cell. FIG. 9 is a conceptual diagram illustrating IDI generated when a base station (BS) uses a full duplex (FD) mode (i.e., a simultaneous Tx/Rx mode using the same frequency) within the same resources. Although FIG. 9 illustrates only 2 UEs for convenience of IDI description, the concept of FIG. 9 may also be applied to the case in which two or more UEs are present.

Since a conventional communication system transmits and receives signals using Frequency Division Duplex (FDD) or Time Division Duplex (TDD), i.e., since the conventional communication system transmits and receives signals using Tx/Rx resources, no IDI occurs. In addition, interference of contiguous cells in the conventional communication system is still valid even in the FDR system, and as such a detailed description thereof will herein be omitted for convenience of description.

Figure 10:
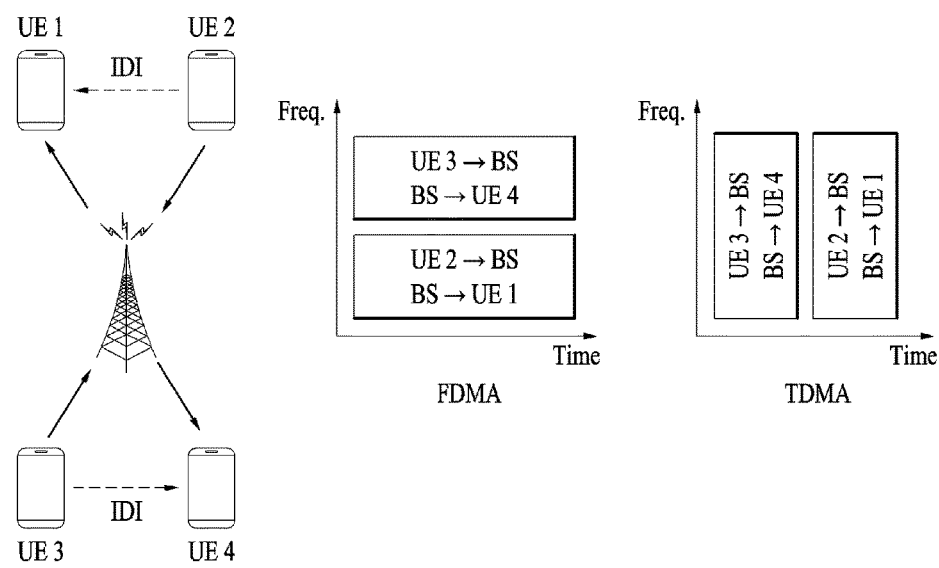
FIG. 10 is a conceptual diagram illustrating multiple access of a user equipment (UE) in a FDR system.

FIG. 10 is a conceptual diagram illustrating multiple access of a UE in the FDR system. Referring to FIG. 10, not only the full duplex scheme using the same resources, but also the other full duplex scheme not using the same resources may be present. FIG. 10 illustrates examples of FDMA and TDMA when a base station (BS) operates in the full duplex (FD) mode in the same resources and several UEs perform multiple access.

In the TDD system using full duplex communication within the same resources, it is assumed that frame configuration for measuring interference between asynchronous devices, transmission of a signal for identifying each device, and listening attempt configuration are performed. Under this assumption, data can be simultaneously transmitted or received within the cell through UE-specific configuration indicating a method for allocating different configurations to the respective UEs within each cell.

That is, after completion of IDI between devices, in order to reduce or remove the measured IDI, a unique signature may be assigned to each UE or each UE group. In this case, a signal for measuring interference capable of being discriminated between UEs will hereinafter be referred to as a signature signal.

Therefore, through the received signature signal, the UE may recognize signal strength of a UE causing IDI, a UE or signature index, a channel vector such as a phase, timing information, etc. Further, the signature signal may identify a UE or a UE group. For example, the signal may be any of a code sequence, a puncturing pattern, etc. That is, a unique scramble or interleaving of a UE or a UE group may be applied using the code sequence. In order to facilitate interference measurement by the Rx UE, the signature signal may also be exclusively transmitted from one UE or one UE group. In this case, an exclusive unit may be a minimum OFDM symbol.

For example, it is assumed that a sequence of the signature signal is mapped to one OFDM symbol and then transmitted. In this case, the index of a sequence to be transmitted by each UE may be calculated through a UE ID. That is, the sequence of the signature signal may be represented as a function of a UE ID. Alternatively, if the size of UE_ID data is larger than an index of the sequence, the index may be calculated using a modular operation as shown in Equation 1.

Sequence Index=(UE ID)mod(Total index number)  [Equation 1]

In accordance with one embodiment, m-sequence may be constructed using UE_ID or a sequence index so as to identify each signature signal. In a secondary synchronization signal (SSS) of LTE, the m-sequence shown in Equation 2 may be used.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

[Equation 2]

UE_ID or sequence index may be used in $N({}^1)_{ID}$), such that m' is acquired and the signature signal is discriminated.

Meanwhile, in the FDR system, a method for grouping a UE group to schedule IDI causing UEs, measuring IDI for such grouping, and reporting the measured IDI may be defined. For example, a UE group may be classified only using the order of IDI magnitudes measured by the respective UEs, and a method for classifying an IDI-magnitude based UE group in consideration of IDI cancellation/mitigation capability of each UE without considering the number of UEs sharing the same resources may also be applied.

A method for measuring IDI having low complexity and reporting the measured IDI when the group is periodically or aperiodically updated, and BS and UE operations based on the same method will hereinafter be given.

IDI measurement is as follows. IDI is generated by use of the same resources. For example, assuming that a total number of IDI causing UEs is N and a total number of IDI measurement UEs is N, IDI measurement must be carried out ($_NC_2*2$) times. Since the FDR system has the same UL/DL frequencies and the same Tx time, channel reciprocity between Tx/Rx devices is established, such that a method for reducing the number of measurement times to $_NC_2$ times using channel reciprocity.

In the system configured to use full duplex communication within the same resources, a group of UEs may be determined to facilitate IDI avoidance or IDI mitigation. A method for reducing the number of IDI measurement times when the group of UEs is periodically or occasionally updated will hereinafter be given. In addition, a method for allowing UEs to generate a configuration for measurement in consideration of channel reciprocity without receiving such configuration from the BS will hereinafter be given.

Since the TDD system has the same UL/DL frequencies, channel reciprocity may be established between Tx/Rx devices. Channel reciprocity may also be established in the FDR system. That is, all UEs do not measure IDI, and only one UE from among UE pairs in which channel reciprocity is established may measure such IDI.

FIG. 11 is a conceptual diagram illustrating IDI measurement according to an embodiment of the present invention. In FIG. 11, it is assumed that the number of IDI causing UEs (i.e., the number of target UEs to be measured) is identical to the number of UEs currently performing measurement. A reference symbol "O" may refer to measurement, and a reference symbol may refer to non-measurement.

In accordance with the legacy measurement scheme of FIG. 11(a), the remaining UEs other than one UE from among 5 UEs must perform such measurement, and must be used as target objects to be measured. As a result, a total number of measurement times of 5 UEs is denoted by $_5C_2*2$.

FIG. 11(b) illustrates an exemplary case in which channel reciprocity is applied to the IDI measurement/target UEs. As can be seen from FIG. 11(b), it can be confirmed that the number of measurement times is reduced from $_5C_2*2$ to $_5C_2$.

In FIG. 11(a), each of all UEs performs measurement four times. However, in FIG. 11(b) based on channel reciprocity, UE (a) performs measurement four times, and UE (e) performs no measurement. In the case of using channel reciprocity as described above, the respective UEs may have irregular measurement loads. If necessary, there is needed a method for selecting a UE to be measured according to a target UE in a manner that UEs to be measured may have uniform measurement loads. However, uniform measurement load is not always mandatory. In another embodiment, for example, assuming that a battery of the UE (e) has no lifespan, measurement of the UE(e) is excluded, such that irregular measurement loads may also be allocated to UEs.

FIG. 12 is a conceptual diagram illustrating an IDI measurement method according to another embodiment of the present invention.

Referring to FIG. 12, a measurement UE and a target UE are mapped in a manner that the respective UEs have uniform measurement loads. In FIG. 12, D may denote a downlink subframe, U may denote an uplink subframe, and X may denote a subframe configured not to perform measurement. In this case, measurement may be carried out in the downlink subframe. Therefore, each UE may perform measurement two times.

For measurement, a total of 5 subframes may be allocated to 5 target UEs. Among 5 subframes, X may actually be a DL or Ul subframe. However, in the subframe denoted by X, the target UE does not perform the UL operation and may selectively perform the DL operation. If UL transmission is performed in the subframe X by a UE not used as a target object, IDI measurement may be affected. For example, when UE(d) and UE(e) measure the UE (a), UL transmission is not allowed in UE(b) and UE(c). Only the UE (a) to be measured may allow UL transmission.

If a total number of IDI causing UEs (or target UEs) is N and a total number of IDI measurement UEs is N, i.e., if Equation 3 is satisfied, uniform measurement load is achieved.

$$_NC_2 \% \ N = 0 \quad \text{[Equation 3]}$$

In Equation 3, % may denote the remainder operator.

In contrast, if Equation 3 is not satisfied, UEs may be designed to have a maximum of uniform measurement load.

FIG. 13 is a conceptual diagram illustrating an IDI measurement method according to another embodiment of the present invention. In FIG. 13, since the number of measurement UEs is 4 and the number of target UEs is 4, Equation 3 is not satisfied. In this case, maximum uniform measurement load implementation may indicate that a difference between a maximum number of measurement times and a minimum number of measurement times is set to a maximum value of 1. In FIG. 13, IDI measurement may be carried out a minimum of one time (UE(c) and UE(d)) and may be carried out a maximum of two times (UE(a) and UE(b)).

FIG. 14 is a conceptual diagram illustrating a subframe configuration according to one embodiment of the present invention.

In accordance with one embodiment, the BS may inform all UEs of configuration regarding UL/DL subframes. For example, all UEs may have the same number of measurement times as shown in FIG. 11(a), only one target UE may receive the UL subframe in a predetermined time unit (one subframe) for measurement, and the remaining UEs may receive the DL subframe.

For example, assuming that all UEs may have the same measurement load, a method for transmitting the subframe configuration to UEs by the BS is as follows. The BS may transmit a basic subframe pattern and a cyclic shift (CS) value regarding the corresponding pattern to the UEs. For example, assuming that basic subframe patterns are denoted by [U, D, D, D, D], the basic subframe pattern may be applied to the UE (a) without change, such that the cyclic shift (CS) value is zero. The CS value of 1 is assigned to UE (b), the subframe pattern for the UE (b) is denoted by [D, U, D, D, D] obtained when the basic subframe pattern is shifted to the right by one. In this case, the BS may include only the subframe configuration used in the UE (a), and may use the shift value of the UL subframe.

However, in order to have a maximum of uniform measurement load as well as to use channel reciprocity, the BS must provide the UE with the configuration including the subframe X. In this case, the number and position of the X subframes may be changed according to the number of measurement/target UEs, the BS must have many more subframe configurations as compared to the case in which the BS includes only the DL/UL subframes.

The embodiment of the present invention may propose a method for allowing a UE not to receive a subframe configuration used for measurement and to autonomously configure the subframe.

When the group is configured or updated, the BS may transmit a UE_ID for identifying a UE within each group to the respective UEs. Accordingly, UEs contained in the i-th group may recognize not only the number ($n_i$) of all UEs but also the number (UE_ID) of other UEs contained in the group. That is, UEs contained in each group may recognize the number of X subframes or the number of D subframes using the total number ($n_i$) of UEs contained in the group including the UEs and channel reciprocity, and may directly determine the subframe configuration.

UE_ID may also refer to the order of UEs contained in the group. For example, the n-th UE_ID may be allocated to the n-th UE. In accordance with another embodiment, the BS may also transmit the list of UE_IDs in which UE_IDs of the respective UEs are sequentially enumerated. As a result, each UE may recognize which order of each UE is established in the group, a total number of UEs, and a UE_ID of another UE within the group.

Figure 15:
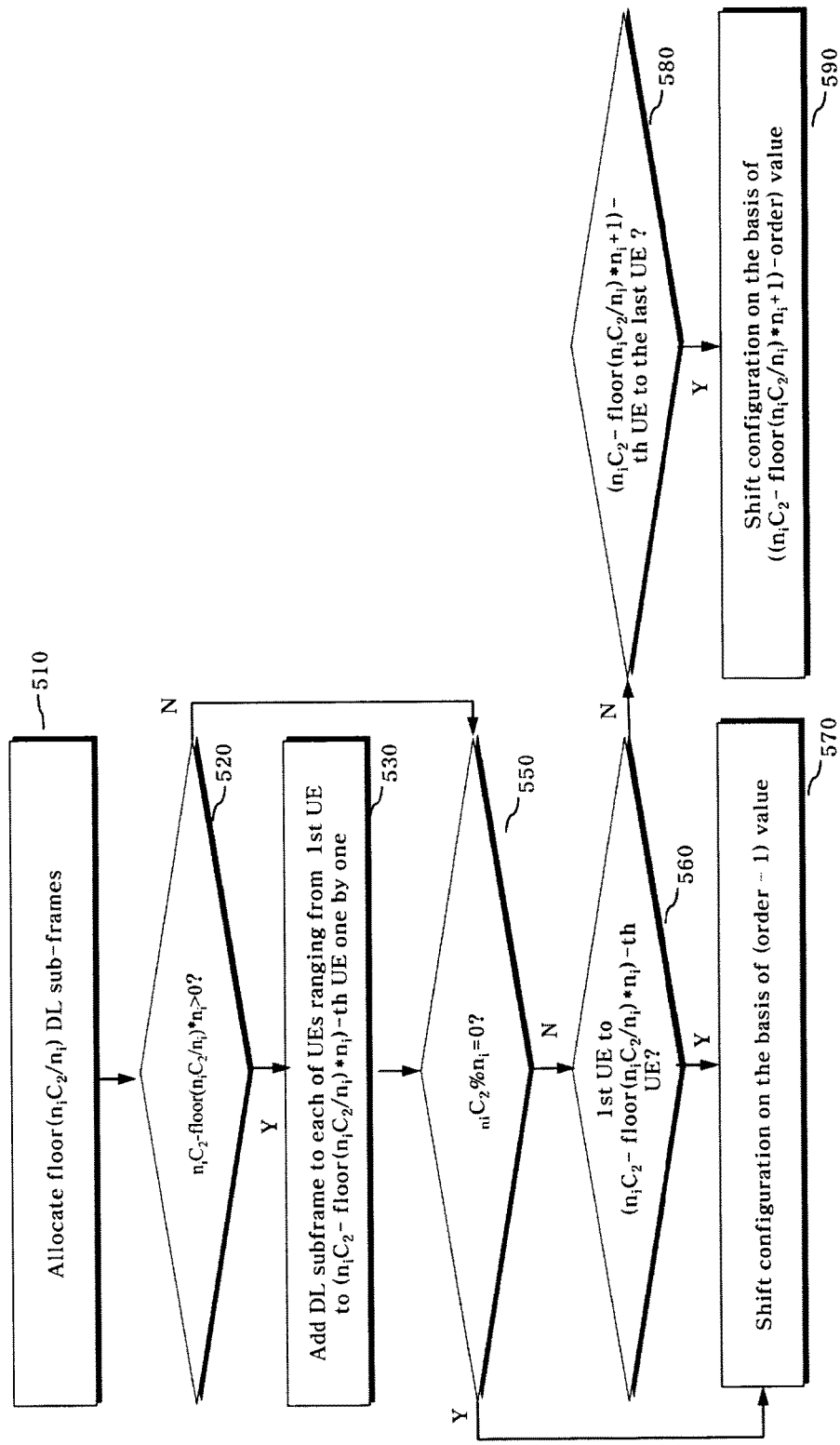
FIG. 15 is a conceptual diagram illustrating a method for measuring IDI according to still another embodiment of the present invention.

FIG. 15 is a flowchart illustrating an algorithm for allowing a UE to determine a subframe configuration according to an embodiment of the present invention.

Referring to FIG. 15, floor($_{ni}C_2/_{ni}$) DL subframes may be allocated to each UE contained in the group (step 510). Here, floor(x) may be a function for indicating the highest one of integers equal to or lower than 'x'. The BS may explicitly perform subframe configuration. In contrast, the UE may autonomously recognize the subframe configuration on the basis of the number ($n_i$) of UEs contained in the group. UE may perform IDI measurement at the allocated DL subframes.

Each UE may determine whether or not $_{ni}C_2$-floor($_{ni}C_2/_{ni}$)*$n_i$>0 is satisfied (step 520). Considering the channel reciprocity, a minimum value needed for IDI measurement within the group is denoted by $_{ni}C_2$. Therefore, through a different between the number of necessary IDI measurement times and the number of IDI measurement times pre-allocated to each UE (i.e., the number of DL subframes×the number of UEs), the presence or absence of the remaining IDI measurement times not allocated to UEs is determined.

If $_{ni}C_2$-floor($_{ni}C_2/_{ni}$)*$n_i$>0 is satisfied, the DL subframe is additionally allocated to UEs ranging from the first UE to the ($_{ni}C_2$-floor($_{ni}C_2/n_i$)*$n_i$)-th UE one by one (step 530). Although the embodiment assumes that DL subframes are sequentially allocated in ascending numerical order of UEs for convenience of description, the scope or spirit of the present invention is not limited thereto. As described above, the UE may recognize a total number of UEs contained in the group and which order of the UE is achieved through a UE_ID of the UE. Accordingly, each UE may recognize whether or not the UE must additionally receive the DL subframe.

Each UE may determine whether $_{ni}C_2 \% \ n_i = 0$ is satisfied in step 550. That is, the UE may determine whether all UEs have the same number of IDI measurement times. If the DL subframe is additionally allocated in step 520, $_{ni}C_2 \% \ n_i = 0$ is not satisfied. Meanwhile, the step for determining whether $_{ni}C_2\% \ n_i=0$ is satisfied may be omitted or the decision result of step 520 may be used according to the embodiment.

If $_{ni}C_2\% \ n_i=0$ is satisfied, only one subframe configuration is present. If $_{ni}C_2\% \ n_i=0$ is not satisfied, two subframe configurations may exist. For example, if $_{ni}C_2\% \ n_i=0$ is not satisfied, the first UE may operate according to the first subframe configuration, and the second UE may operate according to the second subframe configuration. In contrast, if $_{ni}C_2\% \ n_i=0$ is satisfied, all UEs may operate according to the same subframe configuration. However, different shift values to be applied to the subframe configuration may be applied to the respective UEs.

If it is determined that the UE corresponds to any one of the first to $(_{ni}C_2\text{-floor}(_{ni}C_2/n_i)*n_i)$-th UEs in step 560, the shift value of the subframe configuration may be determined to be the (order-1) value in step 570.

In contrast, if the UE corresponds to any one of UEs ranging from the $(_{ni}C_2\text{-floor}(_{ni}C_2/_{ni})*n_i+1)$-th UE to the last UE in step 580, the subframe configuration may be shifted on the basis of the $(n_iC_2\text{-floor}(n_iC_2/n_i)*n_i+1)$-order) value in step 590.

As described above, the term "shift" may indicate that a subframe configuration pattern is cyclically shifted on a subframe basis as described above, and the term "order" may indicate which order of each UE_ID of each UE is achieved when UE_IDs of UEs of the group are arranged.

FIG. 12 illustrates that step 550 is satisfied. FIG. 13 exemplarily illustrates that, when step 550 is not satisfied, the additionally allocated DL subframe is located just after the UL subframe.

Figure 16:
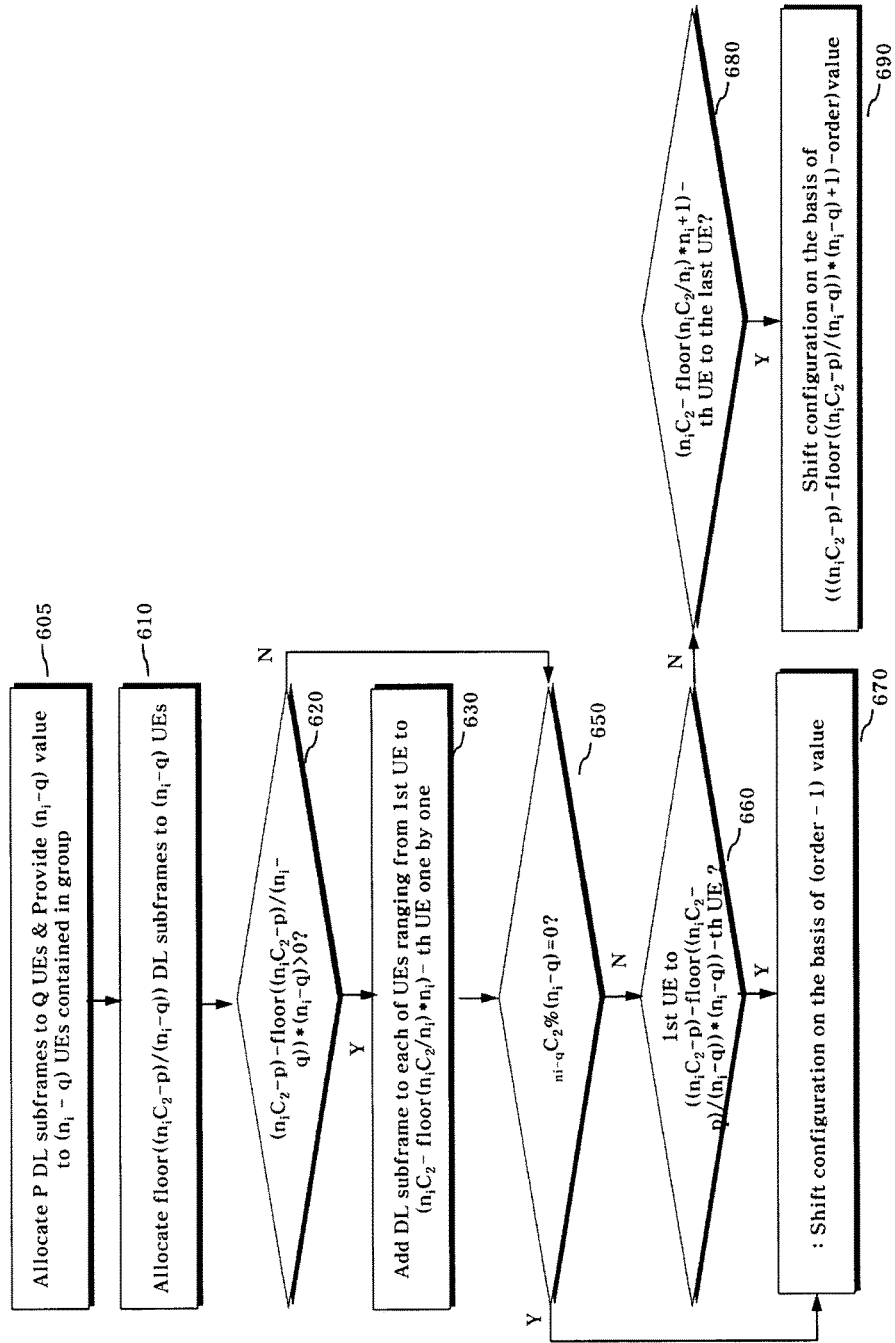
FIG. 16 is a conceptual diagram illustrating a method for measuring IDI according to still another embodiment of the present invention.

FIG. 16 is a flowchart illustrating an algorithm for allowing a UE to determine a subframe configuration according to another embodiment of the present invention.

Although the above-mentioned embodiments have assumed that UEs having low-order UE_IDs perform additional IDI measurement for convenience of description, there may be a UE which does not desire to perform additional IDI measurement in consideration of a UE situation such as a battery situation. In this case, an one-bit signal is applied to a PUSCH such that the UE may inform the BS that the UE is unable to perform additional IDI measurement. For example, if the IDI field is set to '0', this means that the UE can perform additional IDI measurement. If the IDI field is set to '1', this means that the UE may be defined as a UE which does not desire to perform measurement. The BS may recognize the number (q) of UEs which do not desire to perform additional measurement.

The BS may basically allocate P DL subframes to Q UEs in step 605. $(n_iC_2-p)$ DL subframes may be allocated to the remaining $(n_i-q)$ UEs from which the number (Q) of UEs not desiring to perform additional measurement is subtracted. The BS may inform the $(n_i-q)$ UEs contained in the group of the value of $(n_i-q)$.

floor$((n_iC_2-p)/(n_i-q))$ DL subframes may be allocated to the remaining $(n_i-q)$ UEs in step 610.

If $(n_iC_2-p)$-floor$((n_iC_2-p)/(n_i-q))*(n_i-q)>0$ is established in step 620, the DL subframe is additionally allocated to $(n_i-q)$ UEs (from which Q UEs are subtracted) ranging from the $1^{st}$ UE to the $((n_iC_2-p)$-floor$((n_iC_2-p)/(n_i-q))*(n_i-q))$-th UE one by one in step 630.

If Equation 4 is satisfied in the $(n_i-q)$ UEs, only one subframe configuration may be present. If Equation 4 is not satisfied, two subframe configurations may be present.

$$ni\text{-}qC_2\%(n_i\text{-}q)=0 \quad [\text{Equation 4}]$$

If Equation 4 is satisfied in step 650, the shift value may have the (order-1) value at which UE_ID of the UE is located in step 670.

If Equation 4 is not satisfied, the shift value (order-1) is allocated to each of UEs ranging from the $1^{st}$ UE to the $((n_iC_2-p)$-floor$((n_iC_2-p)/(n_i-q))*(n_i-q))$-th UE, and the other shift value $(((n_iC_2-p)$-floor$((n_iC_2-p)/(n_i-q))*(n_i-q)+1)$-order) is allocated to each of UEs ranging from the $((n_iC_2-p)$-floor$((n_iC_2-p)/(n_i-q))*(n_i-q)+1)$-th UE to the last UE in steps 660, 670, 680, and 690.

In the meantime, although channel reciprocity is generally used in the same channel situation, the channel reciprocity may be used to measure signal strength. In this case, UEs constructing one pair of channel reciprocities may have different Tx signal strengths, such that the respective UEs must recognize the Tx signal strength of the counterpart UE corresponding to the paired UE. However, IDI measurement based on group configuration may have advantageous because IDI measurement is possible in the situation in which Tx signal strength of the counterpart UE is not recognized. The measured IDI information is reported to the BS and the BS performs group configuration on the basis of the reported information, such that it is confirmed that the BS has already recognized Tx signal strengths of all UEs. Therefore, the BS may normalize the measured signal strength.

Figure 17:
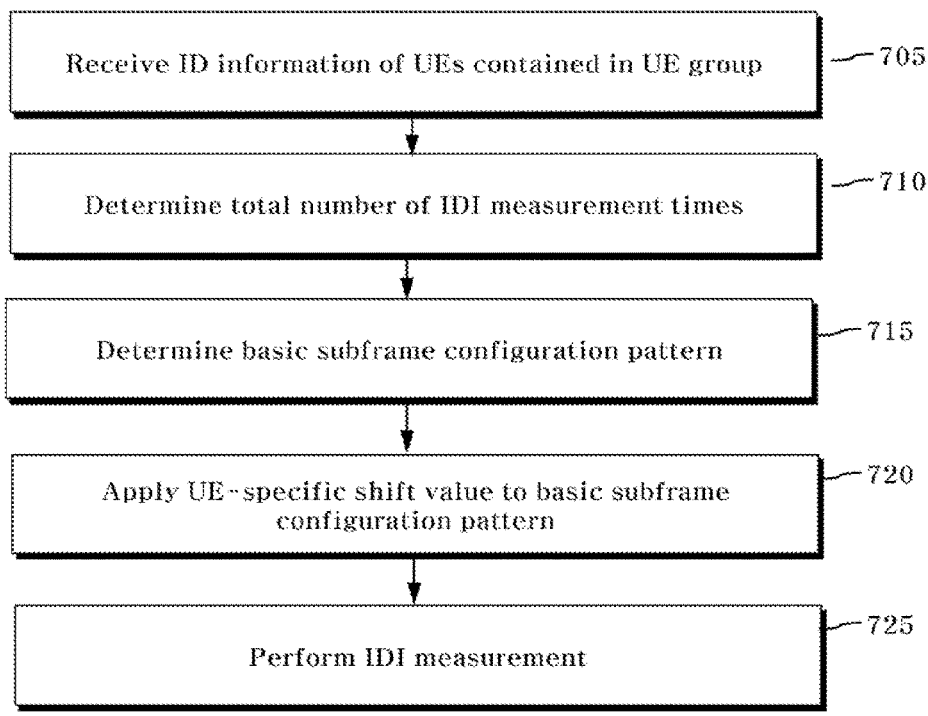
FIG. 17 is a conceptual diagram illustrating a method for measuring IDI according to still another embodiment of the present invention.

FIG. 17 is a flowchart illustrating an IDI measurement method according to another embodiment of the present invention. Redundant matters will not be described herein for clarity.

Referring to FIG. 17, the UE may receive ID information of UEs contained in a UE group in step 705. ID information may be the list of IDs in which IDs of UEs contained in the UE group are arranged according to a predetermined order. The UE may recognize a total number of UEs contained in the UE group and which order of each UE is obtained in the UE group, through ID information.

The UE may determine a total number of IDI measurement times required for the UE group in step 710. The total number of IDI measurement times may be determined in consideration of channel reciprocity in full duplex communication. For example, when the UE group includes a total of N UEs, a total number of IDI measurement times may correspond to NC2. In this case, a total number of UEs may be recognized through the received ID information as described above.

The UE may determine a basic subframe configuration pattern on the basis of the determined number of IDI measurement times in step 715. Although the basic subframe configuration pattern is commonly used by the plurality of UEs contained in the UE group, a UE-specific cyclic shift may be applied to the basic subframe configuration pattern. Therefore, different subframe configurations may be finally allocated to the respective UEs. One or two basic subframe configuration patterns may be present in the UE group. If the UE group satisfies Equation 3, only one basic subframe configuration pattern is present. In contrast, if Equation 3 is not satisfied, two basic subframe configuration patterns may be present.

The basic subframe configuration pattern may include a first-type subframe in which a UE is used as an IDI measurement target, a second-type subframe in which the UE performs IDI measurement, and a third-type subframe in which the UE is not used as an IDI measurement target and does not perform IDI measurement. In the third-type subframe, UL transmission of the UE is prohibited. Meanwhile, the first-type subframe is a UL subframe, the second-type subframe is a Dl subframe, and the third-type subframe is an X-subframe in the above description.

For example, in order to determine a basic subframe configuration pattern, the UE may configure at least one UL subframe and the floor($_NC_2/_N$) DL subframes in the basic subframe configuration pattern. Subsequently, the UE may determine whether to add a DL subframe to the basic subframe configuration pattern according to the $_NC_2$-floor ($_NC_2/N$)*N value. In this case, N is the number of UEs contained in the UE group, and floor ($_NC_2/N$) may be a maximum integer not exceeding the value of $_NC_2/N$.

The UE may apply a UE-specific shift value to the basic subframe configuration pattern in step 720. The UE-specific shift value may be determined on the basis of a predetermined order of UEs contained in the UE group.

The UE may perform IDI measurement on the basis of the basic subframe configuration pattern to which the UE-specific shift value is applied in step 725.

Figure 18:
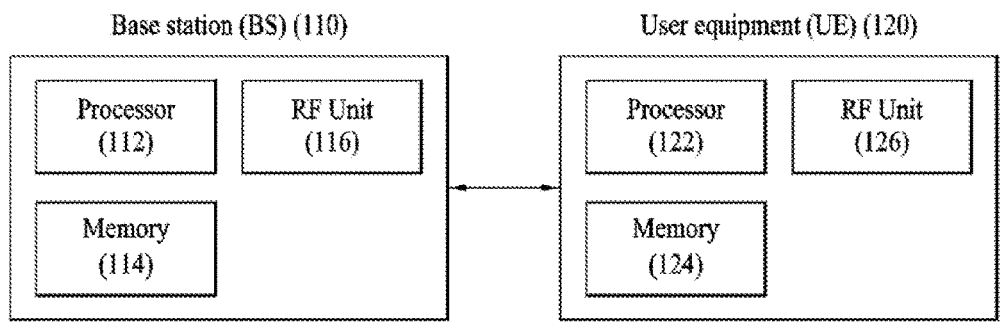
FIG. 18 is a block diagram illustrating a base station (BS) and a user equipment (UE) according to an embodiment of the present invention.

FIG. 18 is a block diagram illustrating a base station (BS) and a user equipment (UE) according to an embodiment of the present invention. Redundant matters will not be described herein for clarity. The BS and the UE of FIG. 18 may carry out the above-mentioned IDI measurement methods.

If a relay is contained in a wireless communication system, communication may be achieved between the BS and the relay through a backhaul link, and communication may be achieved between the relay and the UE through an access link. Therefore, the BS or the UE of FIG. 18 may be replaced with a relay as necessary.

Referring to FIG. 18, a wireless communication system includes a base station (BS) 110 and a user equipment (UE) 120. In DL, a transmitter is a part of the BS 110 and a receiver is a part of the UE 120. In UL, the transmitter is a part of the UE 120 and the receiver is a part of the BS 110. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

In accordance with one embodiment, the processor 122 may determine a total number of IDI (Inter-Device Interference) measurement times required for a UE group including the UE. The processor 122 may determine a basic subframe configuration pattern on the basis of the determined total number of IDI measurement times. The processor may perform as many IDI measurement actions as the number of times allocated to each UE by applying a UE-specific shift value to the basic subframe configuration pattern.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, this invention can be applied to various wireless communication systems.

The invention claimed is:

1. A method for measuring inter-device interference (IDI) at a user equipment (UE) in a wireless communication system supporting full duplex communication, the method comprising:
   determining a total number of IDI measurement times needed for a UE group to which the UE belongs;

determining a basic subframe configuration pattern based on the determined total number of IDI measurement times; and performing IDI measurement for a number of times allocated to the UE by applying a UE-specific shift value to the basic subframe configuration pattern, wherein the determining the basic subframe configuration pattern comprises: configuring at least one uplink subframe and floor($_NC_2/N$) downlink subframes in the basic subframe configuration pattern; and determining whether to add a downlink subframe to the basic subframe configuration pattern according to a value of $_NC_2$-floor($_NC_2/N$)*N, where N is a number of UEs contained in the UE group, and floor ($_NC_2/N$) is a maximum integer not exceeding a value of $_NC_2/N$, wherein the total number of IDI measurement times corresponds to $_NC_2$.

2. The method according to claim 1, wherein the total number of IDI measurement times is determined in consideration of channel reciprocity in the full duplex communication.

3. The method according to claim 1, further comprising:
receiving an identifier list in which identifiers (IDs) of UEs contained in the UE group are arranged according to a predetermined order.

4. The method according to claim 1, wherein the basic subframe configuration pattern includes:
   a first-type subframe in which the UE is used as a target object of the IDI measurement;
   a second-type subframe in which the UE performs the IDI measurement; and
   a third-type subframe in which the UE is not used as the target object of the IDI measurement and does not perform the IDI measurement.

5. The method according to claim 4,
wherein the third-type subframe, uplink (UL) transmission of the UE is prohibited.

6. The method according to claim 1, wherein the UE-specific shift value is determined on based on a predetermined arrangement order of UEs contained in the UE group.

* * * * *